(12) United States Patent
Luetzow et al.

(10) Patent No.: US 6,717,399 B2
(45) Date of Patent: Apr. 6, 2004

(54) MAGNETIC SENSING DEVICE WITH OFFSET COMPENSATION

(75) Inventors: Robert H. Luetzow, Lytle, CA (US); Kenneth A. Brown, Banning, CA (US)

(73) Assignee: Wabash Technologies, Inc., Huntington, IN (US)

( * ) Notice: Subject to any disclaimer, the term of this patent is extended or adjusted under 35 U.S.C. 154(b) by 58 days.

(21) Appl. No.: 10/042,584

(22) Filed: Jan. 9, 2002

(65) Prior Publication Data

US 2002/0145419 A1 Oct. 10, 2002

Related U.S. Application Data

(63) Continuation-in-part of application No. 09/413,647, filed on Oct. 6, 1999, now Pat. No. 6,459,261, which is a continuation-in-part of application No. 09/353,852, filed on Jul. 15, 1999, now Pat. No. 6,356,076.
(60) Provisional application No. 60/308,926, filed on Jul. 31, 2001.

(51) Int. Cl.[7] .............................................. G01B 7/00
(52) U.S. Cl. ........................... 324/207.12; 324/207.21
(58) Field of Search ..................... 324/207.12, 207.21, 324/207.25, 252, 174, 225; 338/32 R; 327/510

(56) References Cited

U.S. PATENT DOCUMENTS

| | | | |
|---|---|---|---|
| 3,729,728 A | 4/1973 | Hardway, Jr. ............... | 340/200 |
| 3,863,235 A | 1/1975 | McKee et al. ......... | 324/207.25 |
| 4,058,705 A | 11/1977 | Cannon ....................... | 235/449 |
| 4,339,727 A | 7/1982 | Kage et al. .................. | 329/106 |
| 4,914,387 A * | 4/1990 | Santos ......................... | 324/252 |
| 4,970,463 A | 11/1990 | Wolf et al. .............. | 324/207.2 |
| 5,012,207 A * | 4/1991 | Edwards ................ | 324/207.12 |
| 5,166,611 A | 11/1992 | Kujawa, Jr. et al. ........ | 324/166 |
| 5,430,373 A | 7/1995 | Ichikawa et al. ...... | 324/207.21 |
| 5,444,369 A | 8/1995 | Luetzow .................. | 324/207.2 |
| 5,493,219 A | 2/1996 | Makino et al. ........ | 324/207.25 |
| 5,570,052 A | 10/1996 | Fonderie et al. ............ | 327/205 |
| 5,612,618 A | 3/1997 | Arakawa ................ | 324/207.25 |
| 5,650,719 A | 7/1997 | Moody et al. .............. | 324/166 |
| 5,663,641 A | 9/1997 | Morita ........................ | 324/174 |
| 5,696,442 A | 12/1997 | Foster et al. ................ | 324/173 |
| 5,719,496 A | 2/1998 | Wolf ........................... | 324/165 |
| 5,747,987 A | 5/1998 | Smith .................... | 324/207.13 |
| 5,754,042 A | 5/1998 | Schroeder et al. ..... | 324/207.25 |
| 5,757,180 A | 5/1998 | Chou et al. .............. | 324/207.2 |
| 5,821,745 A | 10/1998 | Makino et al. ........ | 324/207.25 |
| 5,952,824 A | 9/1999 | Shinjo et al. .......... | 324/207.21 |
| 6,211,670 B1 | 4/2001 | DeWilde et al. ....... | 324/207.21 |

* cited by examiner

Primary Examiner—Walter E. Snow
(74) Attorney, Agent, or Firm—Woodard, Emhardt, Moriarty, McNett & Henry LLP

(57) ABSTRACT

A magnetic incremental motion detection system (110) for outputting a plurality of voltage and/or current signals in digital form wherein the voltage and/or current signals are a collective representation of any incremental rotational, linear, or pivotal movement of an object. A target (120) of the system (110) is adjoined to an object to synchronously move with the object. A plurality of indications (121c, 121d) are adjoined to the target (120), and uniformly and serially disposed along an area (121a) of a surface (121) of the target (120). The system further comprises one or more magnetic sensors (80, 180) spatially positioned from the area of the surface to define air gap areas therebetween. Each of the magnetic sensors (80, 180) are operable to output an analog signal in response to a synchronous movement of the target with the object, and one of two digital circuits (85, 185) output a digital signal in response to the analog signal. The circuitry includes means for compensating for offset in the output signals of the magnetic sensors.

7 Claims, 16 Drawing Sheets

MAGNETIC SENSING DEVICE WITH OFFSET COMPENSATION

CROSS REFERENCE TO RELATED APPLICATIONS

This application is a continuation-in-part of U.S. patent application Ser. No. 09/413,647, filed Oct. 6, 1999, now U.S. Pat. No. 6,459,261, which is a continuation-in-part of U.S. patent application Ser. No. 09/353,852, filed Jul. 15, 1999, now U.S. Pat. No. 6,356,076, and also claims the benefit of the filing date of Provisional Patent Application Serial No. 60/308,926, filed Jul. 31, 2001. The contents of these applications are expressly incorporated by reference into the subject application.

BACKGROUND OF THE INVENTION

The present invention relates generally to magnetic sensing devices, and more particularly to magnetic sensing devices having means for compensating for offset in the output signal of a magnetic sensor.

Magnetic rotational position sensors have been extensively incorporated in engine timing systems of motor vehicles to ascertain the rotational position of a rotary shaft relative to a referenced position of the shaft. A magnetoresistive (MR) sensor having two MR elements in a half-bridge or differential configuration, i.e., with the elements connected in series and supplied with a constant DC voltage, generates an output signal at the junction between the two elements that varies in amplitude as a function of the relative resistance values of the MR elements, and thus varies as a function of variations in magnetic field strength according to the well known magnetoresistive effect. A half-bridge MR sensor positioned adjacent to the teeth of a gear in an electronic ignition timing system, for example, may generate an analog output signal that varies sinusoidally as the teeth pass the sensor in the presence of a magnetic filed. The average or DC value of the sine wave is ideally equal to half the supply voltage. That is, the two MR elements in the half-bridge are ideally equal in resistance when they are equidistant from the center of a tooth or a gap between teeth on the target wheel, such that the output voltage at each such point is half the supply voltage. In this ideal state the output voltage can be compared to a fixed reference voltage equal to half the supply voltage to obtain a digital signal having a 50% duty cycle.

Offsets can occur, however, if the two MR elements are not perfectly matched and aligned or if they experience changes in temperature or other ambient conditions. Temperature compensation is provided to some extent by the bridge configuration itself, but offsets can still occur because, for example, the temperature coefficients of the elements are not necessarily equal. Capacitive (or AC) coupling and other techniques have been employed or proposed for offset compensation in certain applications, but the known techniques are not without disadvantages, such as the inability of an AC-coupled sensing device to reliably sense motion at low speeds. A need therefore remains for improvements in means for compensating for offset in the output signals of magnetic sensors.

SUMMARY OF THE INVENTION

The present invention overcomes a number of disadvantages of the prior art and provides improved means for compensating for offset in the output signals of magnetic sensors.

According to one aspect of the present invention, a magnetic incremental motion detection system with offset compensation comprises a target wheel having a plurality of uniformly circumferentially spaced indications adjoined thereto, a magnetic sensor positioned adjacent the target wheel with an air gap therebetween, a linear amplifier having first and second inputs the first of which is connected to the magnetic sensor, and a low-pass filter connected between the magnetic sensor and the second input of the amplifier.

According to another aspect of the present invention, a magnetic incremental motion detection system with offset compensation comprises a target wheel having more than two uniformly circumferentially spaced indications adjoined thereto, a magnetoresistive sensor positioned adjacent the target wheel with an air gap therebetween, an amplifier having an input connected to the magnetic sensor, a signal comparison stage connected to the amplifier for producing a digital signal in response to the analog output signal of the amplifier, and means for compensating for offset in the output signal of the magnetoresistive sensor.

According to a further aspect of the present invention, a magnetic incremental motion detection system with offset compensation comprises a target wheel having a plurality of uniformly circumferentially spaced indications adjoined thereto, a magnetic sensor positioned adjacent to the target wheel with an air gap therebetween, an amplifier having an input connected to the magnetic sensor, a signal comparison stage connected to the amplifier for producing a digital signal in response to the analog output signal of the amplifier, and means connected between the magnetic sensor and the amplifier for compensating for offset in the output of the magnetic sensor.

DESCRIPTION OF THE PREFERRED EMBODIMENTS

Figure 1A:
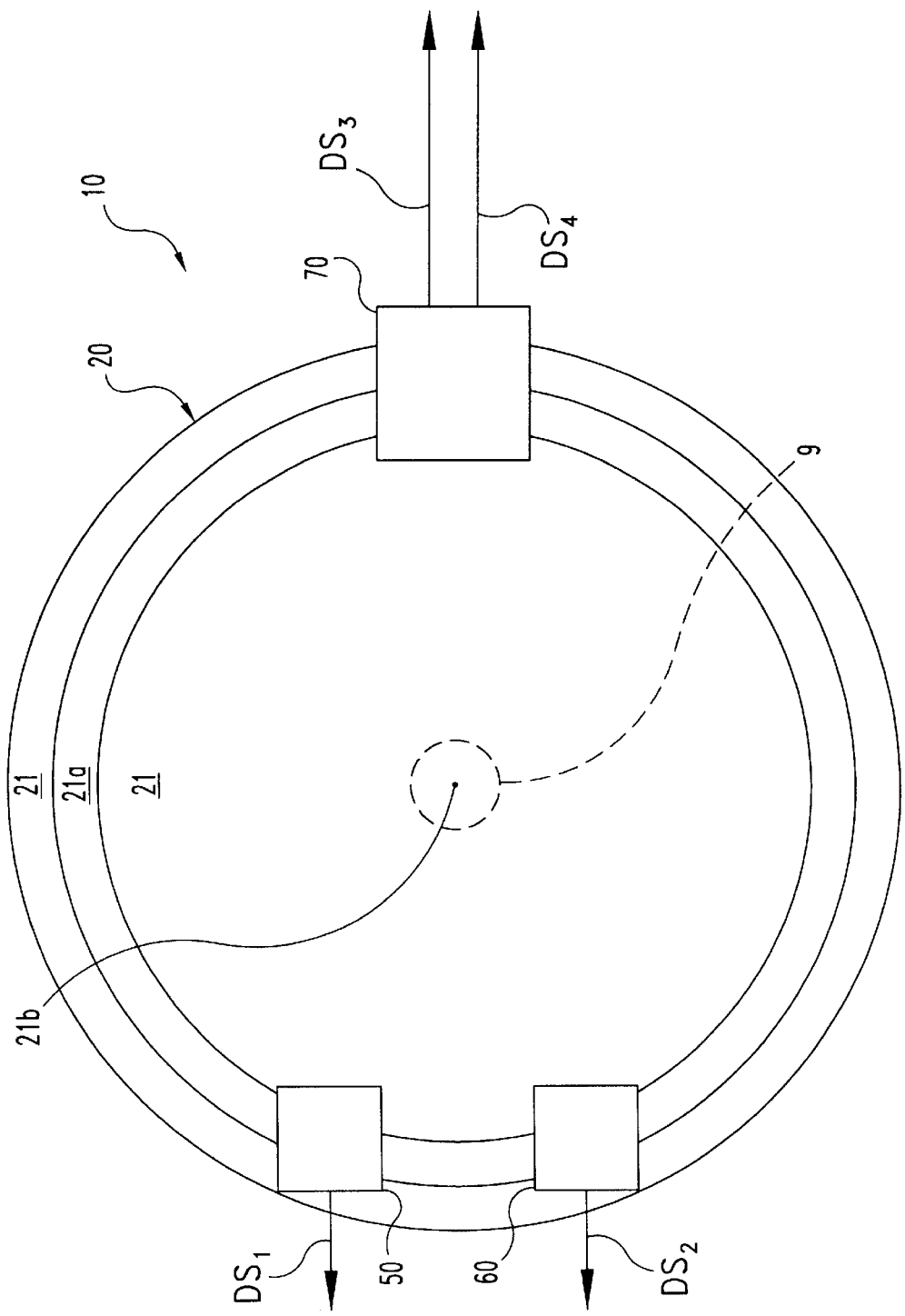
FIG. 1A is a top plan view of a magnetic incremental rotational motion detection system for incrementally detecting a rotational movement of an object in accordance with the present invention.

For the purposes of promoting an understanding of the principles of the present invention, reference will now be made to various embodiments of the present invention, particularly the preferred embodiment, as illustrated in the drawings and specific language will be used to describe the same. It will nevertheless be understood that no limitation of the scope of the claims of the present invention is hereby intended. Any alterations and further modifications in the illustrated embodiments, and any further applications of the principles of the present invention as illustrated herein are contemplated as would normally occur to one skilled in the art to which the present invention relates.

Referring to FIG. 1A, a magnetic incremental rotational motion detection system 10 in accordance with the present invention is shown. Magnetic incremental rotational motion detection system 10 outputs a plurality of voltage and/or current signals in digital form wherein the voltage and/or current signals are a collective representation of an incremental rotation of an object. Each embodiment of magnetic incremental rotational motion detection system 10 comprises a target 20. For purposes of the present invention, target 20 is defined as an article of manufacture or a combination of manufactured articles having a substantially planar surface 21 with a plurality of indications adjoined to surface 21 and serially disposed along an annular area 21a of surface 21; and an indication is defined as a hole, an indentation like a slot, a protrusion like a tooth, or an article of manufacture or combination of manufactured articles like a pole piece or a magnet. For purposes of the present invention, the adjoining of an indication to a target, e.g. target 20, is defined as an unitary fabrication, a permanent affixation, a detachable coupling, an engagement, and/or a contiguous disposal of the indication to the target by any manufacturing method.

The present invention contemplates that target 20 can be magnetic or ferromagnetic, and that indications are either magnetic or ferromagnetic. The present invention further contemplates that target 20 and the indications adjoined to surface 21 can have any geometric configuration and any physical dimensions, and that the annular area 21a can occupy any radial positions from a center 21b of surface 21.

An embodiment of a magnetic incremental rotational motion detection system 10 can further comprise a magnetic sensing device 50 being operable to output a digital signal $DS_1$ as shown and a magnetic sensing device 60 being operable to output a digital signal $DS_2$ as shown, and/or a magnetic sensing device 70 being operable to output a digital signal $DS_3$ and a digital signal $DS_4$ as shown. For purposes of the present invention, a magnetic sensor is defined as any article of manufacture or any combination of manufactured articles including at least one magnetic flux sensitive transducer of any type being operable to output an analog signal as a function of the magnetic flux density of any magnetic flux passing through the magnetic flux sensitive transducer(s); a digital circuit is defined as a circuit that outputs a digital signal as a representation of a property of an inputted analog signal, e.g. zero crossover occurrences, peak amplitude occurrences, etc.; magnetic sensing device 50 and magnetic sensing device 60 are defined as any combination of manufactured articles including at least a magnetic sensor and a digital circuit electrically coupled to the magnetic sensor to thereby input the analog signal from the magnetic sensor; and magnetic sensing device 70 is defined as any combination of manufactured articles including at least a pair of magnetic sensors, a first digital circuit electrically coupled to the first magnetic sensor to thereby input the analog signal from the first magnetic sensor, and a second digital circuit electrically coupled to the second magnetic sensor to thereby input the analog signal from the second magnetic sensor. In addition to the magnetic flux sensitive transducer(s), the present invention contemplates that a magnetic sensor may further comprise one or more pole pieces, and/or one or more magnets.

Figure 2A:
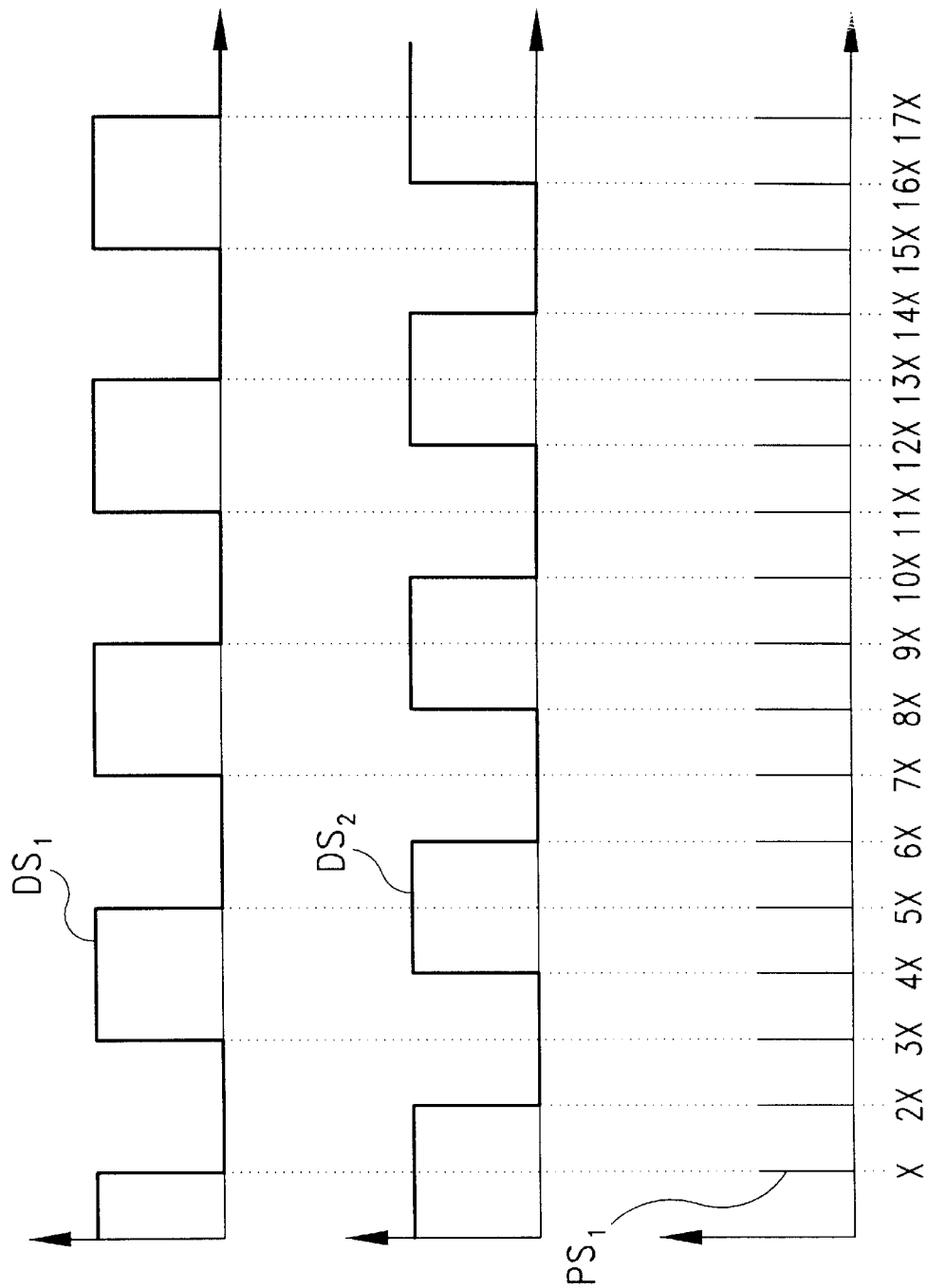
FIG. 2A is set of graphical waveforms of a pair of digital signals from any of the magnetic incremental motion detection systems of FIGS. 1A–1C, and a graphical waveform of a pulse signal as a function of the pair of digital signals.

Referring to FIGS. 1A and 2A, an example of an incremental rotational motion detection of a rotary shaft 9 by an utilization of target 20, magnetic sensing device 50, and magnetic sensing device 60 will now be described herein. Rotary shaft 9 rotates about its longitudinal axis, and target 20 is adjoined to rotary shaft 9 with the longitudinal axis of rotary shaft 9 perpendicularly intersecting center 21b whereby target 20 synchronously rotates with rotary shaft 9 about is longitudinal axis. For purposes of the present invention, an adjoining of target 20 to an object like rotary shaft 9 is broadly defined as an unitary fabrication, a permanent affixation, a detachable coupling, an engagement, and/or a contiguous disposal of target 20 to the object. Each magnetic flux sensitive transducer of magnetic sensing devices 50 and 60 are spatially positioned from annular area 21a to thereby define an air gap therebetween, and each flux sensitive transducer of magnetic sensing devices 50 and 60 as well as any indications adjacent the flux sensitive transducer(s) are disposed within a magnetic field generated by target 20, and/or a magnet or magnets of magnetic sensing devices 50, if any. Consequently, any synchronous rotational movement of target 20 with rotary shaft 9 will increase or decrease the reluctance across the air gaps to thereby alter the density of the magnetic flux flowing through the magnetic flux sensitive transducer(s) of both magnetic sensing device 50 and magnetic sensing device 60. To output digital signal $DS_1$ and digital signal $DS_2$ as individual representations of any synchronous rotational movement of target 20, the magnetic flux sensitive transducer(s) of magnetic sensing device 50 and magnetic sensing device 60 must be spatially positioned relative to each other whereby a magnetic flux line of the magnetic field(s) can not simultaneously intersect two magnetic flux sensitive transducer(s).

The present invention contemplates that the incremental rotational movements of rotary shaft 9 can be detected in any multiple of degrees, e.g. every degree, every three (3) degrees, every ten (10) degrees, every one-tenth (1/10) of a degree, etc. Accordingly, the number of indications as well as the geometric configuration and physical dimensions of the indications are selected whereby a common width of each indication and a common distance between indications are both a function of the desired multiple of degrees to be detected. This principle will be further illustrated in connection with FIG. 3A and described in the accompanying text. The magnetic flux sensitive transducer(s) of magnetic sensing devices 50 and 60 are positioned relative to the indications and to each other whereby digital signals $DS_1$ and $DS_2$ have the same duty cycle, e.g. a 50% duty cycle as shown in FIG. 2A, and digital signal $DS_1$ and $DS_2$ are preferably out of phase by ninety (90) degrees as shown in FIG. 2A.

A pulse waveform $PS_1$ is shown as a function of each rising edge and falling edge of digital signal $DS_1$ and digital signal $DS_2$. Each rising edge and falling edge of digital signals $DS_1$ and $DS_2$ represents a desired multiple X of degrees to be detected, and therefore, each pulse of pulse waveform $PS_1$ is generated upon each incremental rotation of rotary shaft 9 as a function of the desired multiple X of degrees to be detected. Consequently, a computer can monitor each rising edge and falling edge of digital signal $DS_1$ and digital signal $DS_2$ to thereby ascertain each incremental rotational degree of movement of rotary shaft 9, and/or a pulse waveform like pulse waveform $PS_1$ can be inputted into an electronic device like a counter whereby the total number of incremental rotations can be ascertained. For embodiments of magnetic incremental rotational motion detection system 10 comprising magnetic sensing device 70, it is to be appreciated that the magnetic flux sensitive transducers of magnetic sensing device 70 are positioned relative to the indications and to each other whereby digital signals $DS_3$ and $DS_4$ are outputted as individual representations of any synchronous rotational movement of target 20, digital signals $DS_3$ and $DS_4$ have the same duty cycle, and digital signal $DS_3$ is a predetermined number of degrees out of phase with digital signal $DS_4$.

Figure 1B:
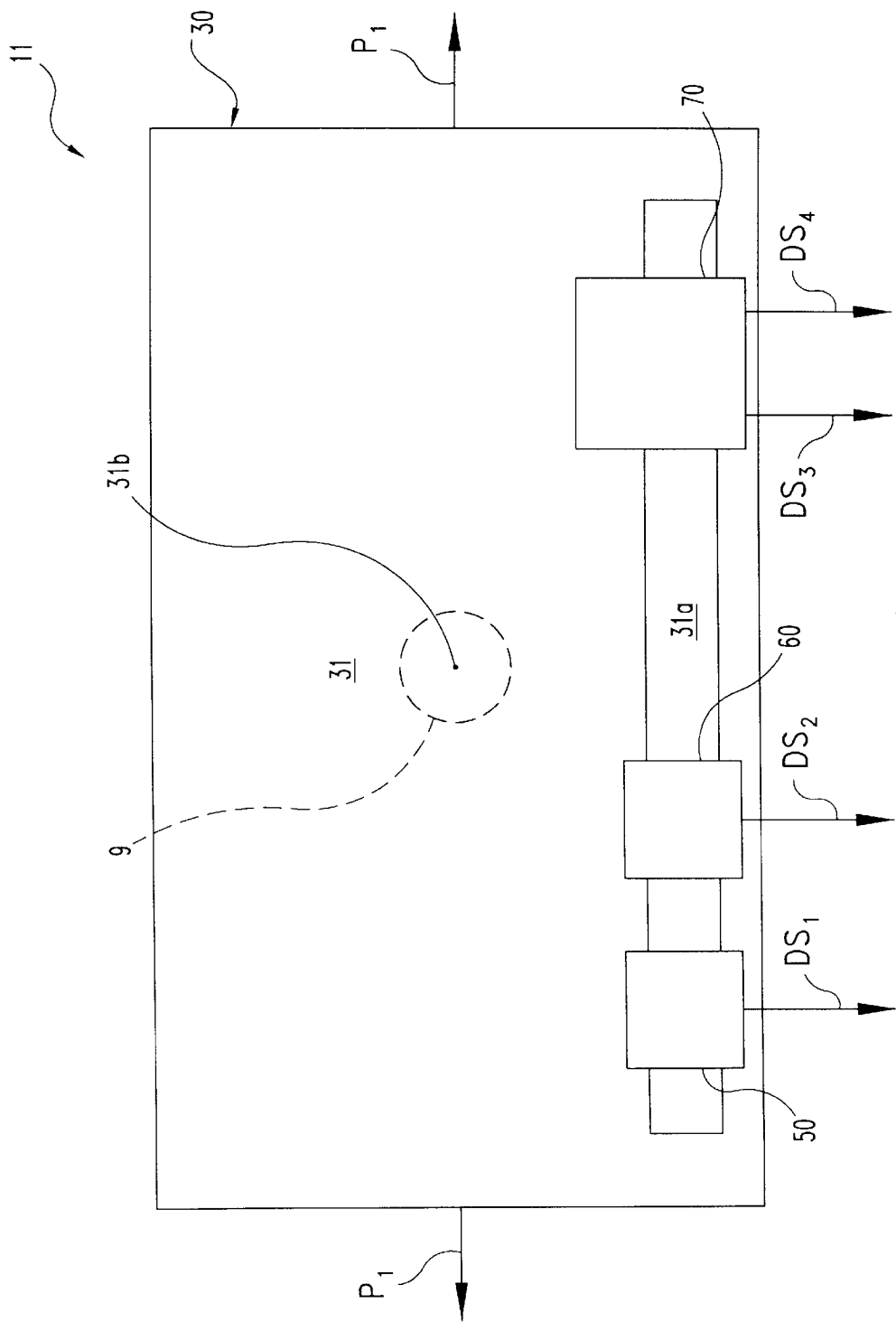
FIG. 1B is a top plan view of a magnetic incremental linear motion detection system for incrementally detecting a linear movement of an object in accordance with the present invention.

Referring to FIG. 1B, a magnetic incremental linear motion detection system 11 outputs a plurality of signals in digital form as a collective representation of an incremental linear displacement of an object. The system includes a substantially planar surface 31 with a plurality of indications adjoined to surface 31 and serially disposed along a rectangular area 31a of surface 31. Rotary shaft 9 is linearly displaced along a path $P_1$, and target 30 is adjoined to rotary shaft 9 with the longitudinal axis of rotary shaft 9 perpendicularly intersecting a center 31b of surface 31 to thereby synchronously linearly displace target 30 with rotary shaft 9 along path $P_1$. The system construction may otherwise be the same as that of system 10 described above. Synchronous linear displacement of target 30 with rotary shaft 9 will increase or decrease the reluctance across the air gaps to thereby alter the density of the magnetic flux flowing through the magnetic flux sensitive transducer(s) of magnetic sensing devices 50 and 60. Each pulse of pulse waveform $PS_1$ is generated upon each incremental linear displacement of rotary shaft 9 as a function of the desired increment of linear displacement to be detected. Consequently, a computer can monitor each rising edge and falling edge of digital signal $DS_1$ and digital signal $DS_2$ to thereby ascertain each incremental linear displacement of rotary shaft 9, and/or a pulse waveform like pulse waveform $PS_1$ can be inputted into an electronic device like a counter whereby the total number of incremental linear displacements can be ascertained.

Figure 1C:
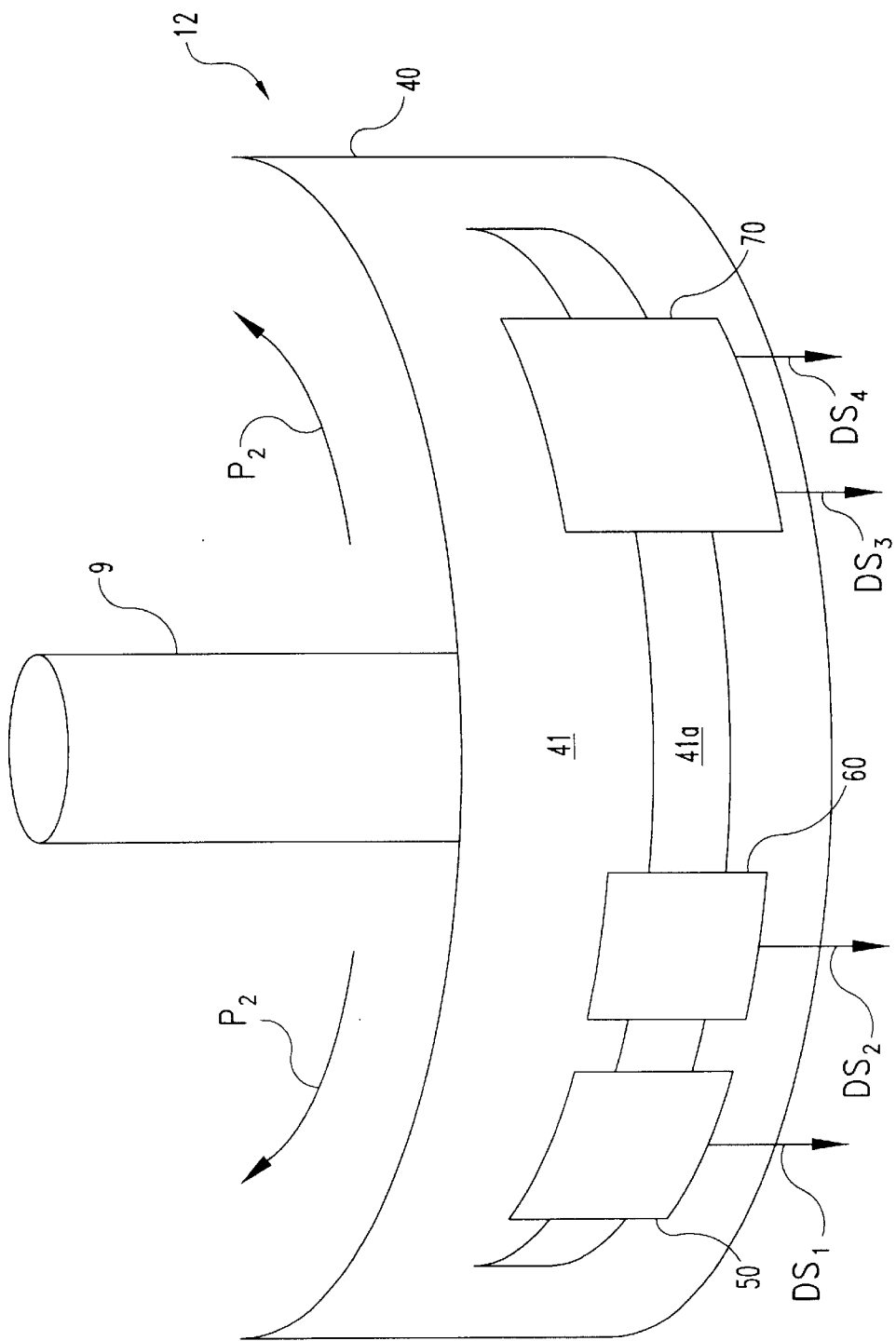
FIG. 1C is a top plan view of a magnetic incremental pivotal motion detection system for incrementally detecting a pivotal movement of an object in accordance with the present invention.

Referring to FIG. 1C, a magnetic incremental pivotal motion detection system 12 in accordance with the present invention outputs a plurality of signals in digital form as a collective representation of an incremental pivotal displacement of an object. The system includes a substantially planar surface 41 with a plurality of indications adjoined to surface 41 and serially disposed along an arcuate area 41a of surface 41. Rotary shaft 9 is pivotally displaced along a path $P_2$, and target 40 is adjoined to rotary shaft 9 with the longitudinal axis of rotary shaft 9 perpendicularly intersecting a side surface (not shown) of target 40 to thereby synchronously pivotally displace target 40 with rotary shaft 9 along path $P_2$. The system construction may otherwise be the same as that of system 10 described above. Synchronous pivotal displacement of target 40 with rotary shaft 9 will increase or decrease the reluctance across the air gaps to thereby alter the density of the magnetic flux flowing through the magnetic flux sensitive transducer(s) of magnetic sensing devices 50 and 60. Each pulse of pulse waveform $PS_1$ is generated upon each incremental pivotal displacement of rotary shaft 9 as a function of a desired multiple X of degrees to be detected. Consequently, a computer can monitor each rising edge and falling edge of digital signal $DS_1$ and digital signal $DS_2$ to thereby ascertain each incremental pivotal displacement of rotary shaft 9, and/or a pulse waveform like pulse waveform $PS_1$ can be inputted into an electronic device like a counter whereby the total number of incremental pivotal displacements can be ascertained.

Figure 2B:
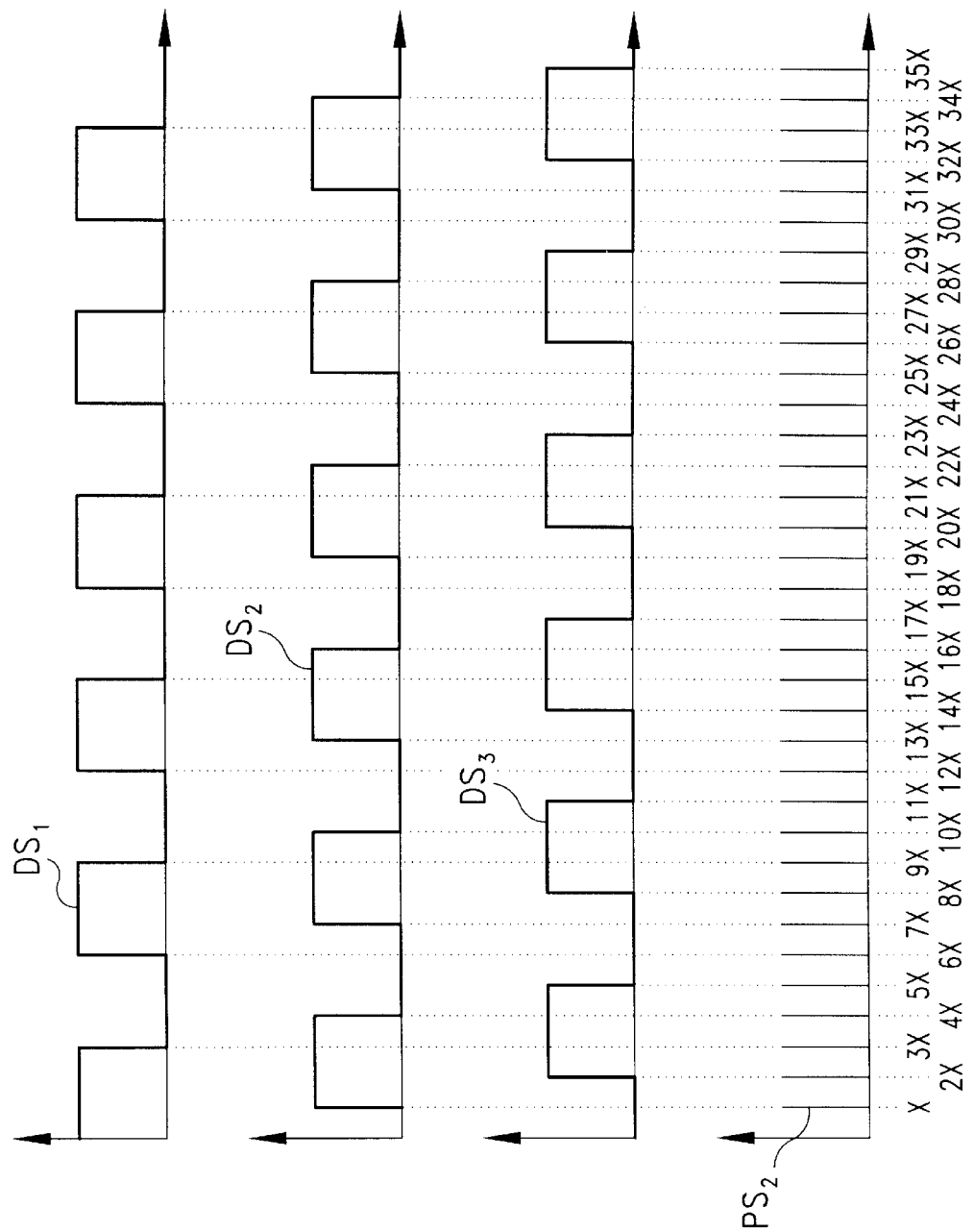
FIG. 2B is a set of graphical waveforms of a trio of digital signals from a magnetic incremental motion detection system in accordance with the present invention, and a graphical waveform of a pulse signal as a function of the trio of digital signals.

Referring to FIG. 2B, the present invention contemplates that a magnetic incremental motion detection system, e.g. magnetic incremental rotational motion detection system 10 (FIG. 1A), can aggregately comprise three or more magnetic sensing device operable to output a digital signal. Accordingly, a pulse waveform $PS_2$ is shown as a function of digital signal $DS_1$ as outputted by magnetic sensing device 50 (FIGS. 1A–1C), digital signal $DS_2$ as outputted by magnetic sensing device 60 (FIGS. 1A–1C), and a digital signal $DS_3$ as outputted by a third magnetic sensing device. Digital signal $DS_1$, digital signal $DS_2$, and digital signal $DS_3$ all have a 50% duty cycle. Digital signal $DS_2$ is sixty (60) degrees out of phase with digital signal $DS_1$, and digital signal $DS_3$ is sixty (60) degrees out of phase with digital signal $DS_2$. Consequently, a greater number of pulses of pulse waveform $PS_2$ are generated over the same range of movement of an object than the generated pulses of pulse waveform $PS_1$ (FIG. 2A).

Figure 3A:
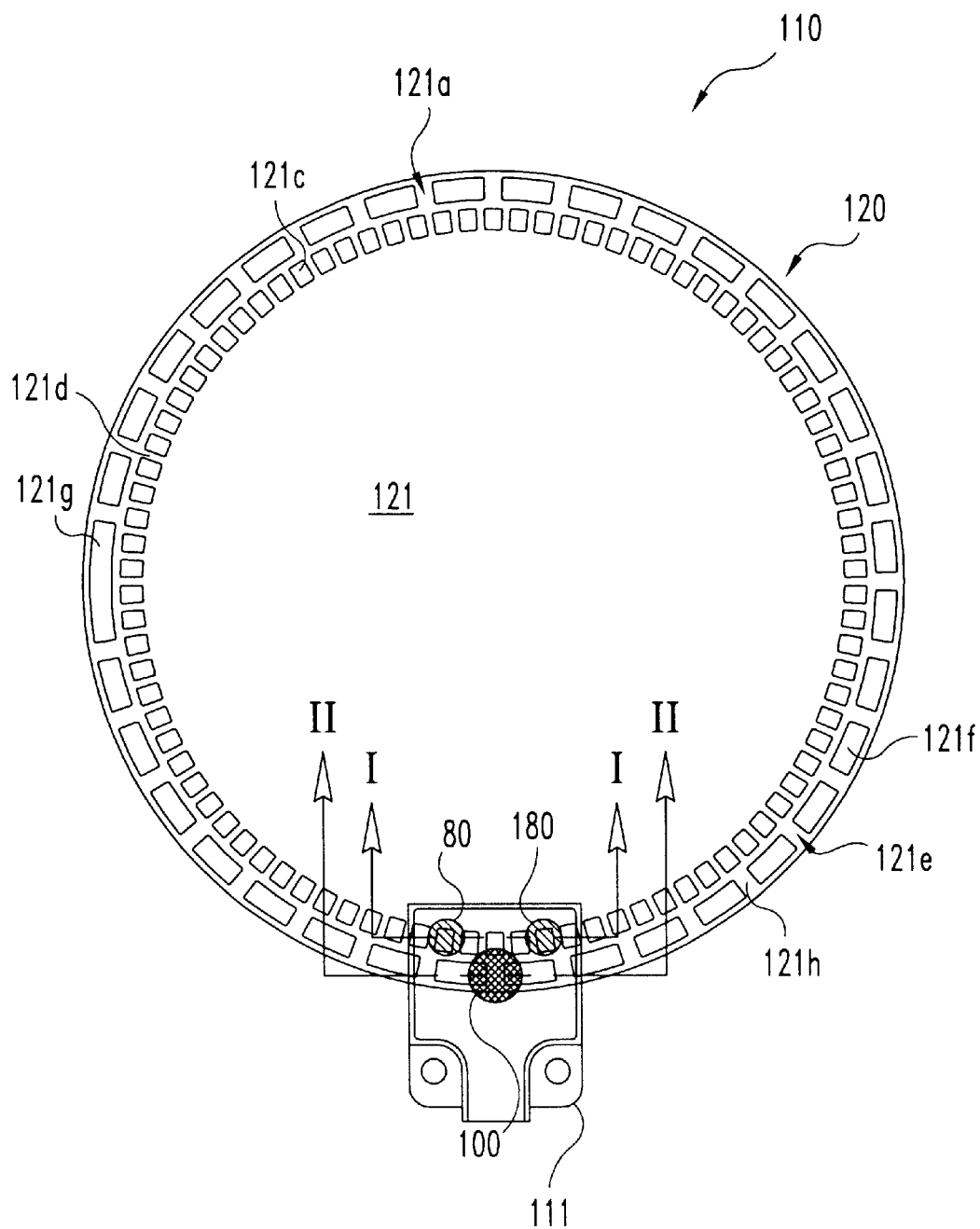
FIG. 3A is a bottom plan view of a preferred embodiment of the magnetic incremental rotational motion detection system of FIG. 1A.

Referring to FIG. 3A, a magnetic incremental rotational motion detection system 110 as one embodiment of magnetic incremental rotational motion detection system 10 (FIG. 1A) is shown. Magnetic incremental rotational motion detection system 110 comprises a target wheel 120. Target wheel 120 has a planar annular surface 121 with ninety (90) rectangular holes 121c disposed therethrough, and uniformly and serially spaced along an annular area 121a to thereby define ninety (90) ribs 121d whereby a width of each hole 121a is identical and a width of each rib 121d is identical. Preferably, target wheel 120 is ferromagnetic, the diameter of target wheel 120 is between six (6) and ten (10) inches, a width of each slot 121c is approximately 2.62 degrees, and a width of each rib 121d is 1.38 degrees. Magnetic incremental rotational motion detection system 110 further comprises a magnetoresistance (MR) sensor 80 and a magnetoresistance (MR) sensor 180. For purposes of the present invention, magneto-resistance sensor 80 and magneto-resistance sensor 180 are defined as any combination of manufactured articles including at least one magneto-resistor in series between an input terminal and a reference terminal, and electrically coupled to an output terminal to thereby output an analog signal in response to a magnetic flux density of any magnetic flux flowing through the magnetoresistor(s).

Figure 3B:
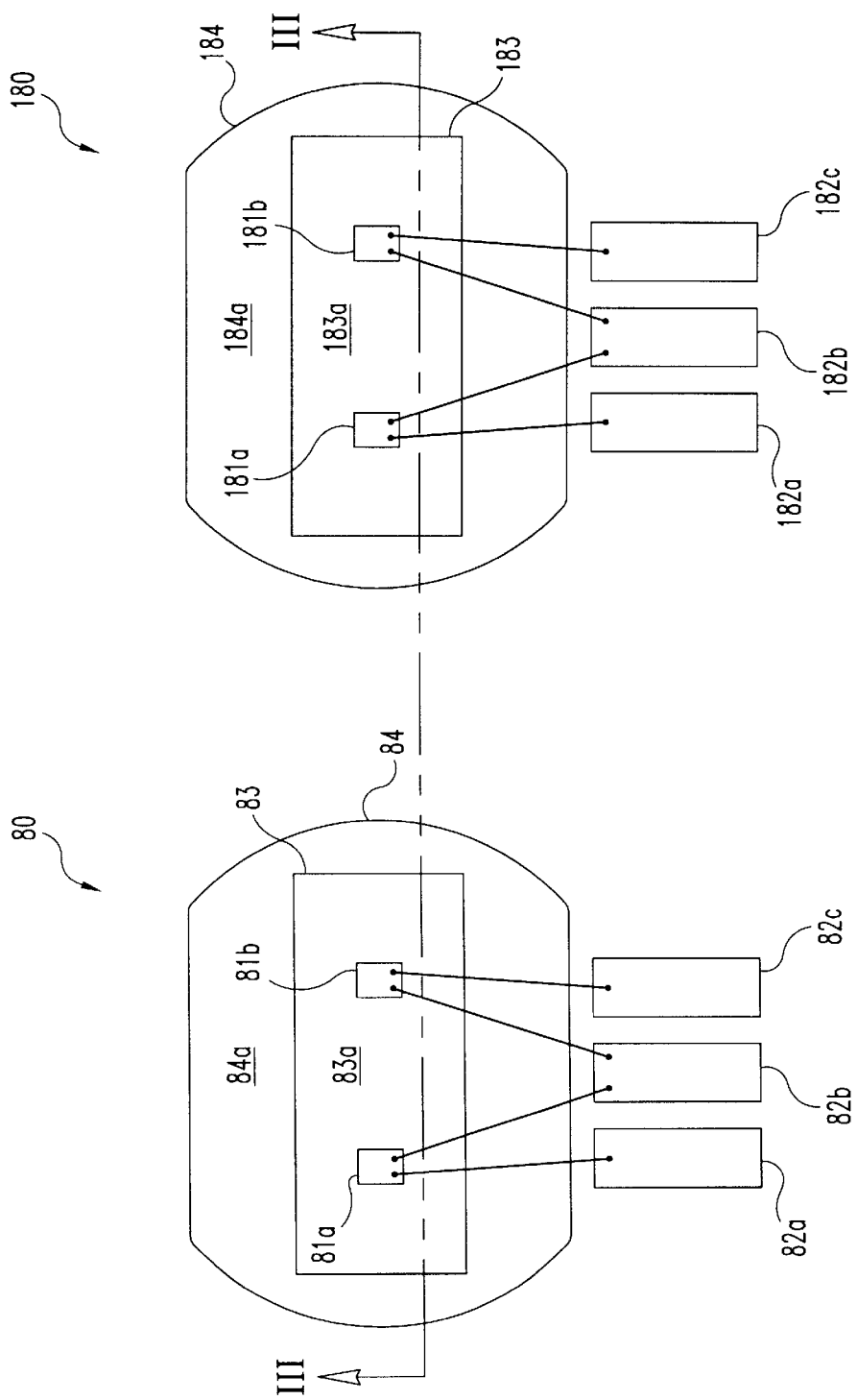
FIG. 3B are top plan views of an embodiment of a pair of magneto-resistance sensors of FIG. 3A.
Figure 3C:
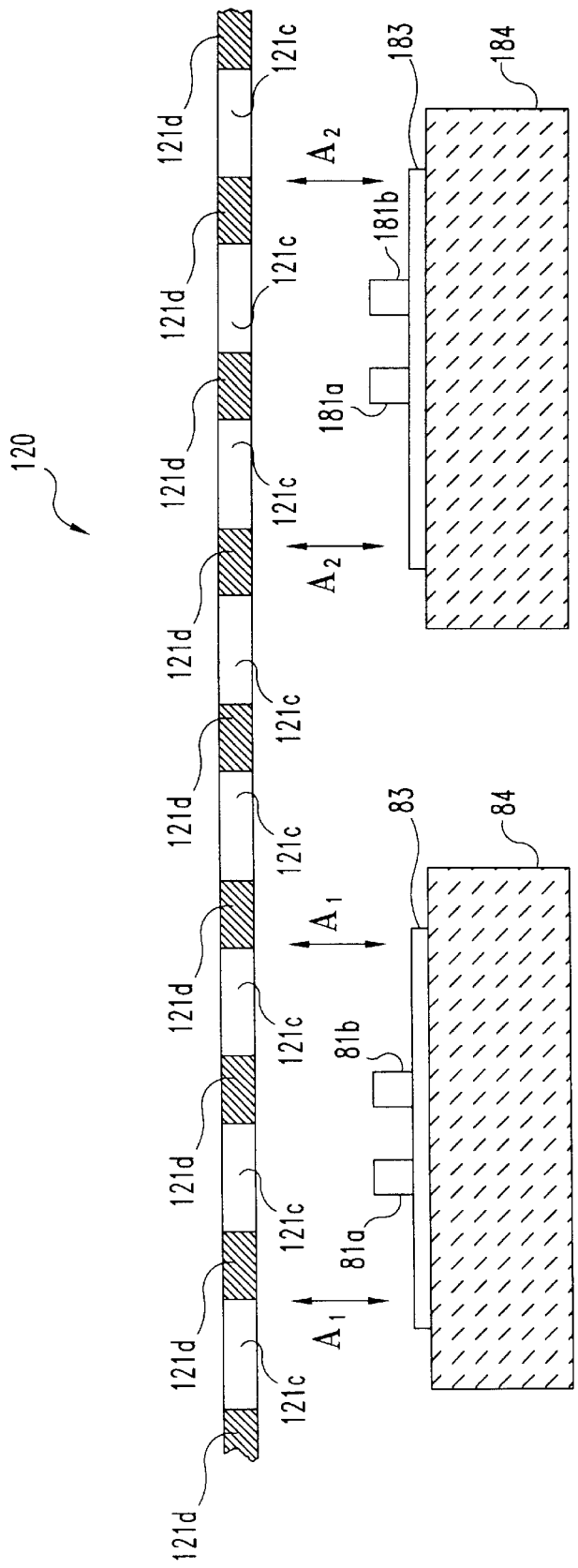
FIG. 3C are cross-sectional side views of the magneto-resistance sensors of FIG. 3B taken along line III—III as spatially positioned from a cross-sectional side view of a target wheel of FIG. 3A taken along line I—I.

Referring to FIGS. 3B and 3C, magneto-resistance sensor 80 includes a magnetoresistor element 81a, a magneto-resistor 81b, a contact 82a as an input terminal, a contact 82b as an output terminal, a contact 82c as a reference terminal, a conductive layer 83, and a magnet 84. Magneto-resistor 81a and magneto-resistor 81b are disposed on surface 83a of conductive layer 83, and conductive layer 83 is disposed on a pole surface 84a, north or south, of magnet 84. Preferably, pole surface 84a is a north pole surface of magnet 84. Magneto-resistor 81a and magneto-resistor 81b are spatially positioned from target wheel 120 to define an air gap area $A_1$ therebetween whereby a magnetic field (not shown) as generated by magnet 84 traverses air gap area $A_1$. Magneto-resistor 81a is electrically coupled to contact 82a and to contact 82b, and magneto-resistor 81b is electrically coupled to contact 82b and to contact 82c to thereby output an analog signal from contact 82b when a power source is electrically coupled to contact 82a and a common reference is electrically coupled to contact 82c. Preferably, magneto-resistor 81a and magneto-resistor 81b are made from the same die with the same dimensions; magneto-resistor 81a and magneto-resistor 81b are spaced by a 0.559 magnetic wavelength; and air gap area $A_1$ varies if at all between 0.5 millimeters and two (2) millimeters to thereby output the analog signal. Incremental rotational motion detection system 110 further comprises a digital circuit (not shown) electrically coupled via an amplifier to contact 82b to produce a digital signal, e.g. digital signal $DS_1$ (FIGS. 2A and 2B).

Magneto-resistance sensor 180 includes a magneto-resistor element 181a, a magneto-resistor 181b, a contact 182a as an input terminal, a contact 182b as an output terminal, a contact 182c as a reference terminal, a conductive layer 183, and a magnet 184. Magneto-resistor 181a and magneto-resistor 181b are disposed on surface 183a of conductive layer 183, and conductive layer 183 is disposed one a pole surface 184a, north or south, of magnet 184. Preferably, pole surface 184a is a north pole surface of magnet 184. Magneto-resistor 181a and magneto-resistor 181b are spatially positioned from target wheel 120 to define an air gap area $A_2$ therebetween whereby a magnetic field (not shown) as generated by magnet 184 traverses air gap area $A_2$. Sensor 180 is in other respects the same as sensor 80.

Figure 3D:
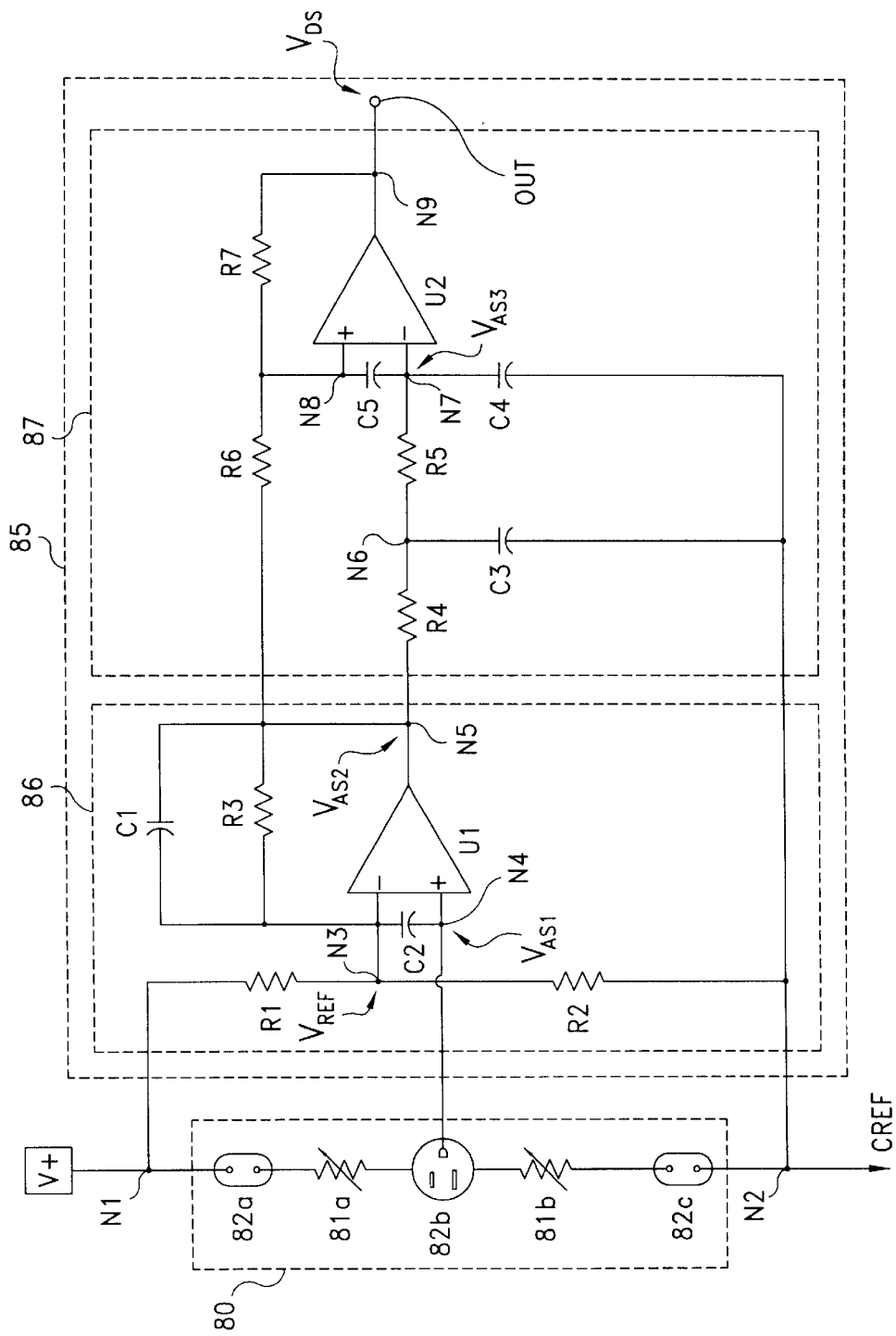
FIG. 3D is a schematic diagram of a first embodiment of a magnetic sensing device of FIG. 3A.

An exemplary operation of magneto-resistance sensor 80 and various embodiments of circuitry in accordance with the present invention will now be described. Referring to FIG. 3D, a schematic diagram of magneto-resistance sensor 80 and a circuit 85 in accordance with the present invention is shown. As will be appreciated, sensor 80 includes magnetoresistive (MR) elements 81a and 81b connected to form a half-bridge which produces an analog signal $V_{AS1}$ at its output contact 82b, which is connected to a node N4 and the non-inverting input of operational amplifier (op amp) U1 which, together with the associated resistors and capacitors as illustrated, forms a signal amplification stage 86. The half-bridge is supplied with DC power at supply terminals N1 and N2; as is apparent in the drawing, voltage V+ is a positive voltage with respect to a common reference (CREF). Op amp U1 is supplied with power from the same power supply. That is, the positive and negative power supply pins of the op amp are connected to V+ and CREF, respectively. Resistors R1 and R2 establish a bias point, or a fixed reference signal $V_{REF}$, for the op amp. $V_{REF}$ is preferably equal to one-half of V+. The gain of the amplifier in the frequency range of interest is set by the values of resistors R1, R2 and R3 and may be set to a value of approximately 20. Capacitor C1 is included to roll off the frequency response curve of the amplifier, i.e., to reduce the amplifier gain, at higher frequencies so as to eliminate or at least reduce the circuit response to signals, such as electromagnetic interference, that are outside the desired operating range of the circuit. Capacitor C2 is included, as shown, for similar reasons.

The amplifier amplifies the analog signal $V_{AS1}$ from the half-bridge MR sensor and produces a second analog signal $V_{AS2}$ at its output (node N5), which is connected to a signal comparison stage 87 as shown in the drawing. $V_{AS2}$ is supplied to a comparator U2 (powered by the same power supply as U1) through resistor R6 as shown. The reference voltage for the comparator is the average value of $V_{AS2}$, i.e., the DC component thereof, as obtained with a low-pass filter (LPF) consisting of resistors R4 and R5 and capacitors C3 and C4.

Figure 3E:
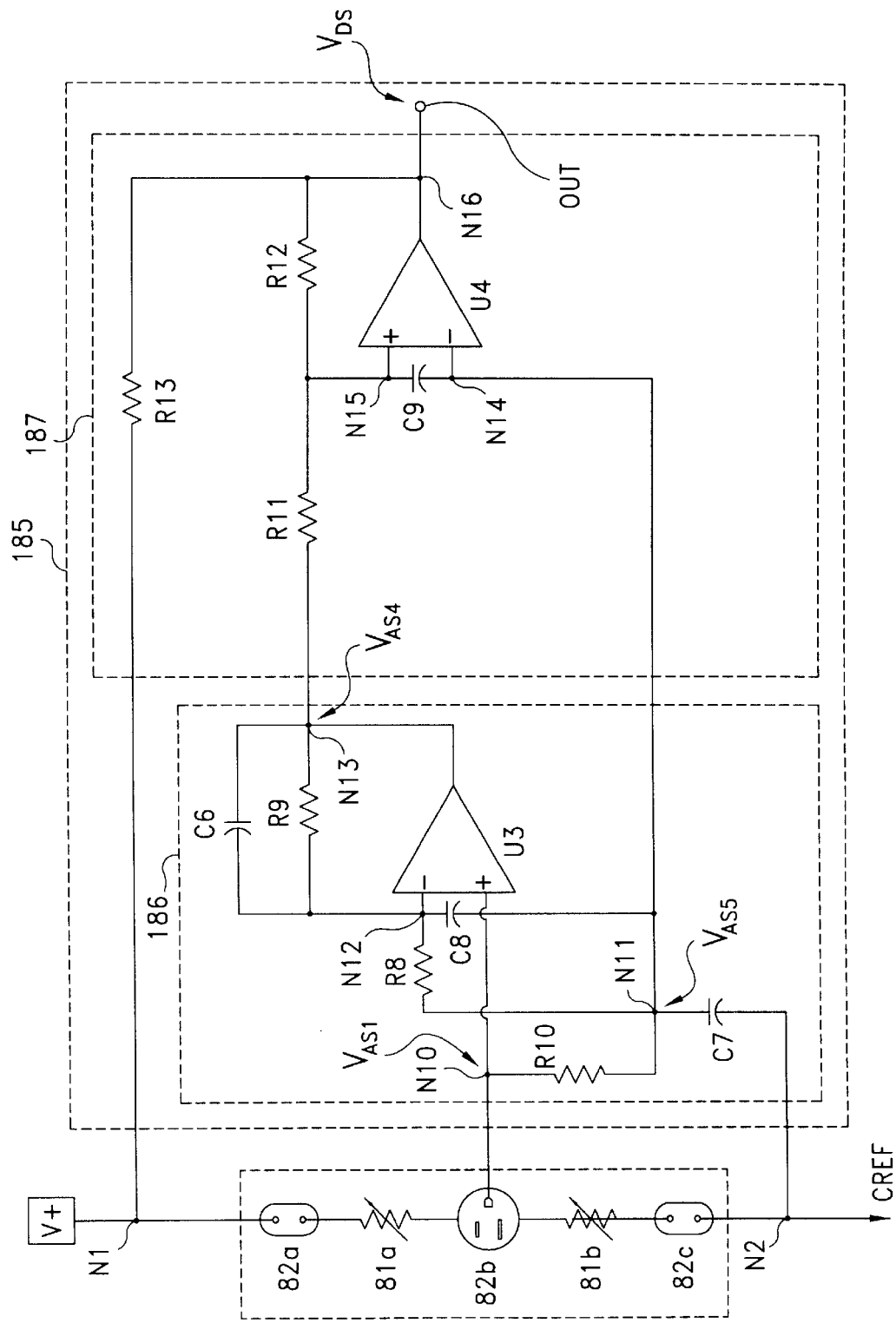
FIG. 3E is a schematic diagram of a second embodiment of a magnetic sensing device of FIG. 3A.

FIG. 3E is a schematic diagram of a second embodiment of a magnetic sensing device according to the present invention. The sensing device is similar to that described above with reference to FIG. 3D, including a circuit 185 that includes an amplification stage 186 and a comparison stage 187. In this case, however, a low-pass filter comprising resistor R10 and capacitor C7 is connected between MR sensor 80 and the operational amplifier. Amplifier gain is set by the values of R8, R9 and C6 and may be the same as that of amplifier 86 described above with reference to FIG. 3D. Unlike amplifier 86, amplifier 186 does not have a fixed bias as part of the non-inverting gain configuration. Any offset in MR sensor output signal $V_{AS1}$ with respect to ½V+ is amplified by amplifier 86 (FIG. 3D), resulting in a larger offset which may lead to signal clipping. Amplifier 186 in FIG. 3E does not amplify the offset. That is, the circuit is designed such that the low-pass filter substantially filters out the AC component of $V_{AS1}$ and thereby produces an output signal $V_{AS3}$ having the same DC level as $V_{AS1}$. The op amp output signal $V_{AS4}$ also has that same DC level as a result of the disclosed circuit configuration, as described below in further detail in connection with FIG. 6. Thus, $V_{AS4}$ is the amplified AC component of $V_{AS1}$ plus the unamplified DC component of $V_{AS1}$, and it is compared in amplitude to the same DC level ($V_{AS5}$), whereby the effects of offsets in the MR sensor are eliminated and the MR sensor output signal may therefore be converted to a digital waveform having a 50% duty cycle as desired.

Figure 3F:
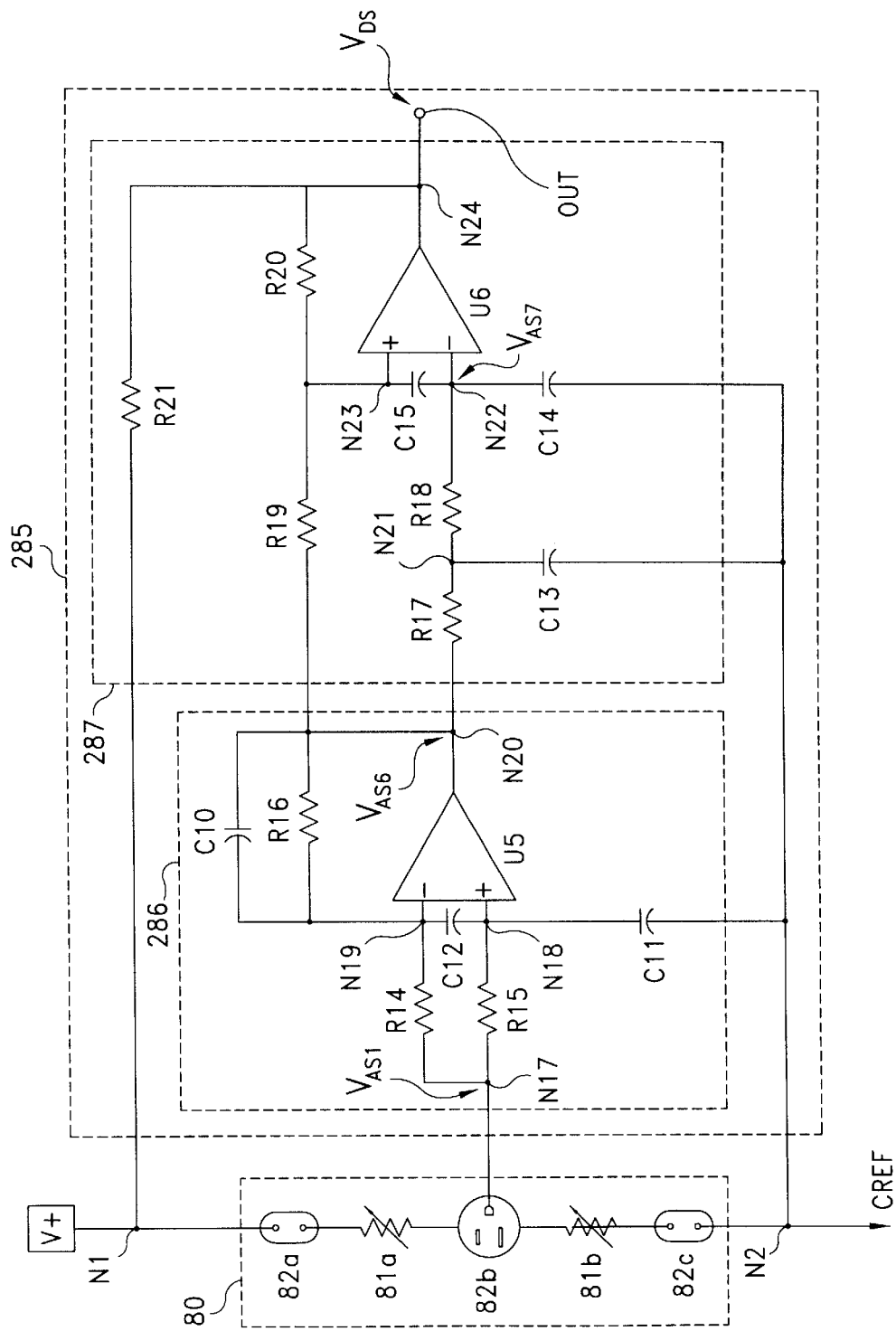
FIG. 3F is a schematic diagram of a third embodiment of a magnetic sensing device of FIG. 3A.

Referring to FIG. 3F, a third embodiment of a magnetic sensing device according to the present invention includes an MR sensor 80 connected to a circuit 285 including an amplification stage 286 and a signal comparison stage 287 as shown. In this case, the circuit includes two low-pass filters. One consists of resistor R15 and capacitor C11 and has its output connected to the non-inverting input of op amp U5, which is provided with associated components R14, R16 and C10 to provide amplification as described above with reference to FIG. 3D. Similar to the circuit of FIG. 3D, circuit 285 includes a low-pass filter, consisting of R17, R18, C13 and C14 in this case, connected between amp U5 and comparator U6, which thus compares the amplified output signal of the op amp, in this case $V_{AS6}$, with the DC component thereof.

Figure 3G:
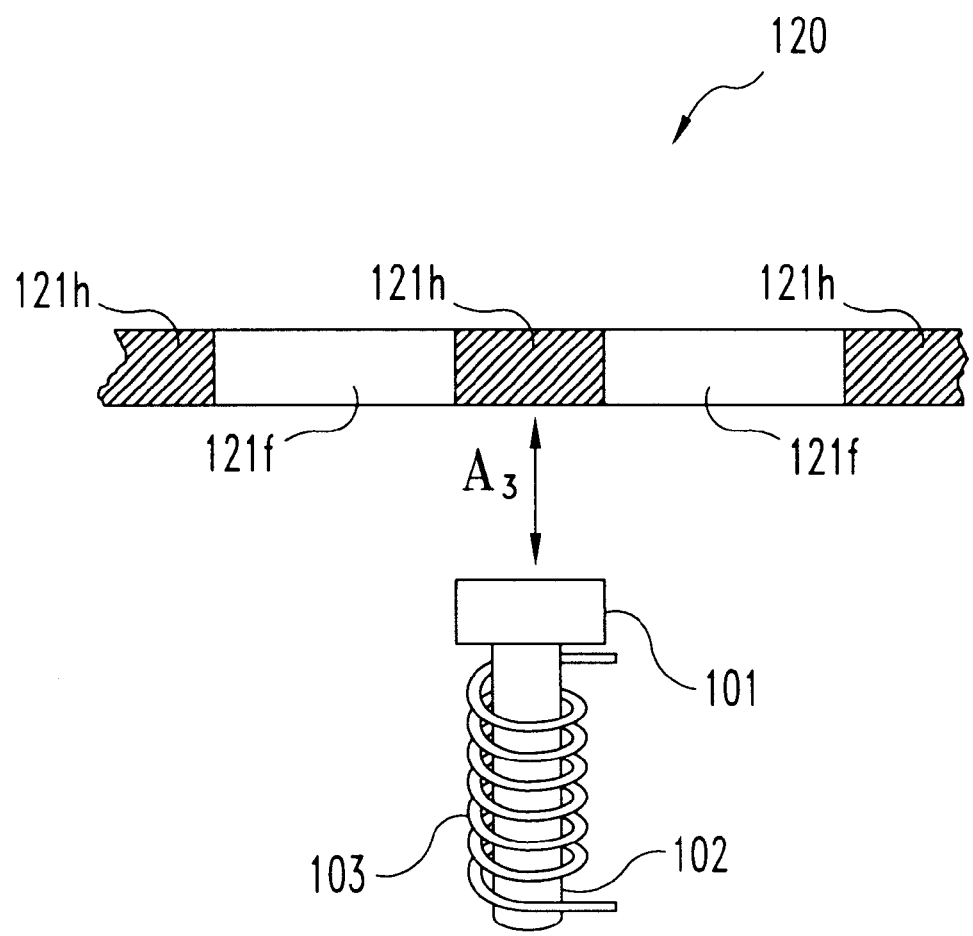
FIG. 3G is a side view of a variable-reluctance sensor of FIG. 3A as spatially positioned from a cross-sectional side view of the target wheel of FIG. 3A taken along line II—II.

Referring to FIGS. 3A and 3G, incremental rotational motion detection system 110 optionally comprises a variable-reluctance sensor 100. For purposes of the present invention, variable-reluctance sensor 100 is defined as any combination of manufactured articles including a coil having a pair of terminals to thereby generate and output an analog signal as a function of a variant in a magnetic flux density of any magnetic flux flowing through coil. The present invention contemplates the variable-reluctance sensor may or may not have one or more pole pieces, and/or one or more magnets. Preferably, variable-reluctance sensor 100 includes a magnet 101 having one of its pole surface spatially positioned from an annular area 121e of surface 121 to define an air gap area $A_3$ therebetween whereby a magnetic field (not shown) generated by magnet 101 traverses air gap area $A_3$, a pole piece 102 adjacently disposed with the other pole surface of magnet 101, and a coil 103 disposed around the pole piece 102 to thereby generate an analog signal. It is further preferred that the north pole surface of magnet 84 (FIGS. 3B and 3C), the north pole surface of magnet 184 (FIGS. 3B and 3C), and the north pole surface of magnet 101 are facing target wheel 120 to thereby allow magneto-resistance sensor 80, magneto-resistor sensor 180, and variable reluctance sensor 100 to be adjacently disposed within a housing 111.

When magnetic incremental rotational motion detection system 110 comprises variable-reluctance sensor 100 as shown, surface 121 preferably has thirty-four (34) rectangular holes 121f disposed therethrough, and uniformly and serially spaced along annular area 121e, and a rectangular hole 121g disposed therethrough and uniformly spaced between two holes 121f to thereby define thirty-five (35) ribs 121h whereby a width of each hole 121f is identical, a width of each rib 121h is identical, and a width of hole 121g is slightly greater than twice the width of a hole 121f. The present invention contemplates that annular area 121e can be located at radial positions from a center 121b of surface 121 that are greater than the radial positions of annular area 121a from center 121b as shown, or less than the radial positions of annular area 121a from center 121b. A width of magnet 100 is no greater than the width of holes 121f. Preferably, the width of magnet 100 is identical to the width of holes 121f as shown whereby coil 103 will generate and output an analog signal as a sine wave in response to synchronous rotation of target wheel 120 with an object, e.g. rotary shaft 9, when magnet 100 is facing a portion of a hole 121f or a rib 121h, and coil 103 will not generate and output the analog signal when magnet 100 is completely facing hole 121g. This is beneficial because magneto-resistor 80 and magneto-resistor 180 can be utilized in an engine timing of an electric motor, and variable-reluctance sensor 100 can be utilized in an ignition timing of the electric motor while the three (3) sensor are adjacently disposed within housing 111. In addition, target wheel 120 can be disposed between the three sensors and a magnetic interference generating device, e.g. an open frame electric motor, whereby target wheel 120 will serve as a shielding device that prevents an interference by any electrical or magnetic noise from magnetic interference generating device with the outputting of the analog signals from the three magnetic sensors.

Figure 4A:
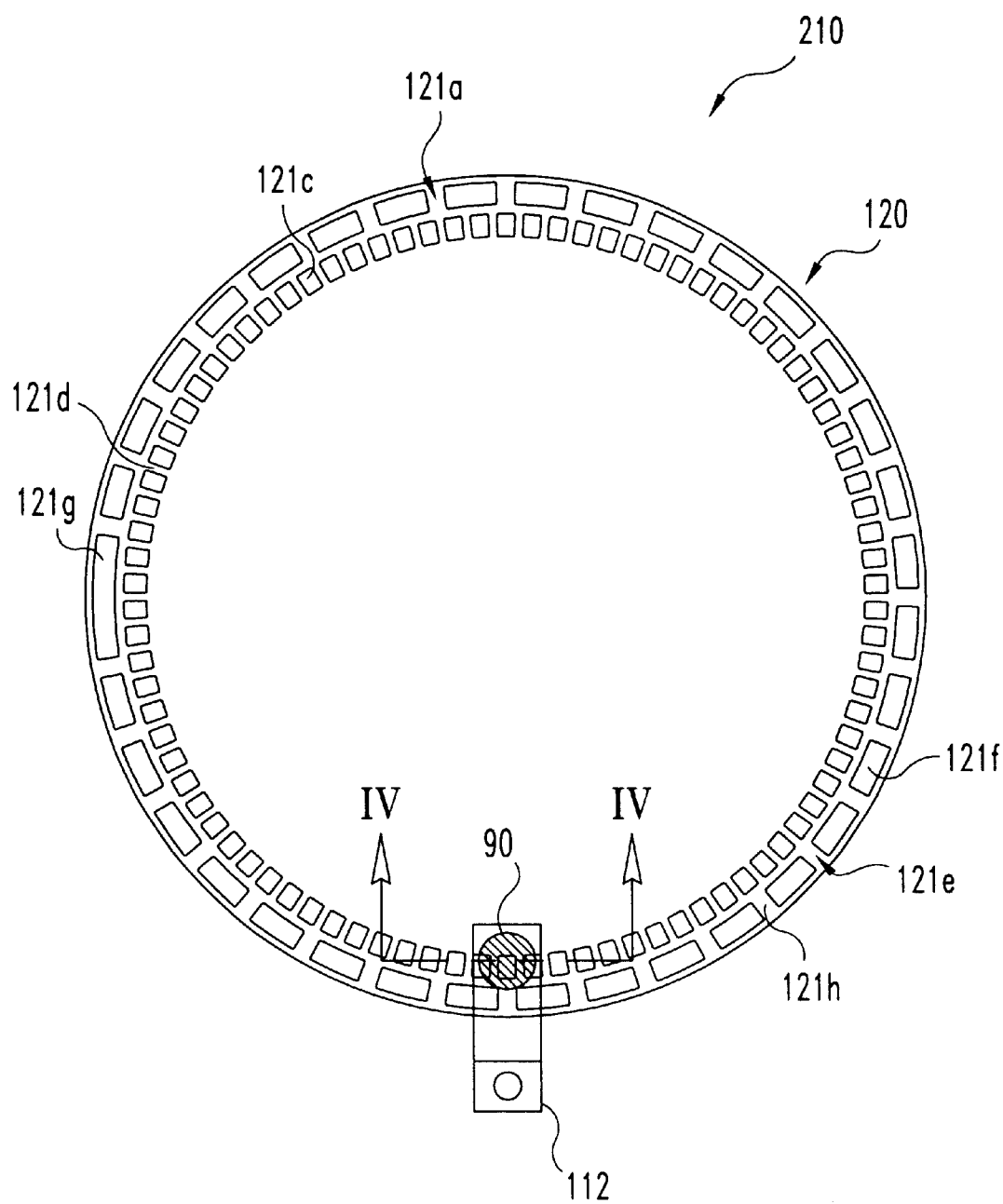
FIG. 4A is a bottom plan view of a second embodiment of the magnetic incremental rotational motion detection system of FIG. 1A.

Referring to FIG. 4A, a magnetic incremental rotational motion detection system 210 as an another embodiment of magnetic incremental rotational motion detection system 10 (FIG. 1A) is shown. Magnetic incremental rotational motion detection system 210 comprises target wheel 120 as previously illustrated herein in connection with FIG. 3A and described in the accompanying text. Magnetic incremental rotational motion detection system 210 further comprises a magneto-resistance sensor 90. For purposes of the present invention, magneto-resistance sensor 90 is defined as any combination of manufactured articles including a first set of at least one magneto-resistor in series between a first input terminal and a first reference terminal, and electrically coupled to a first output terminal to thereby output a first analog signal as a function of a magnetic flux density of any magnetic flux flowing through the first set of at least one magneto-resistor(s), and further including a second set of at least one magneto-resistor in series between a second input terminal and a second reference terminal, and electrically coupled to a second output terminal to thereby output a second analog signal as a function of a magnetic flux density of any magnetic flux flowing through the second set of at least one magneto-resistor(s).

Figure 4B:
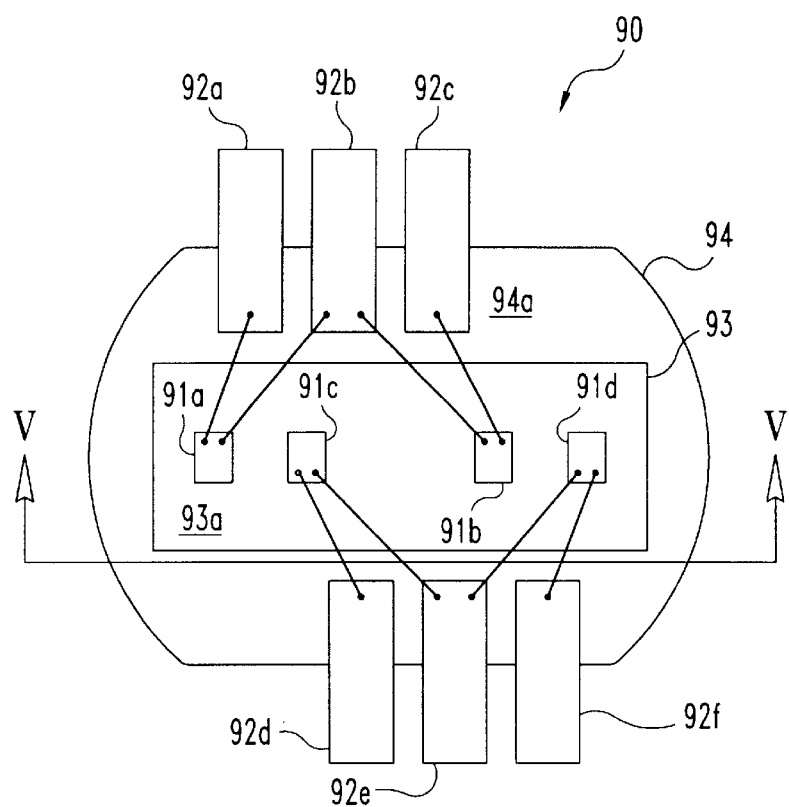
FIG. 4B is a top plan view of an embodiment of a magneto-resistance sensor of FIG. 4A.
Figure 4C:
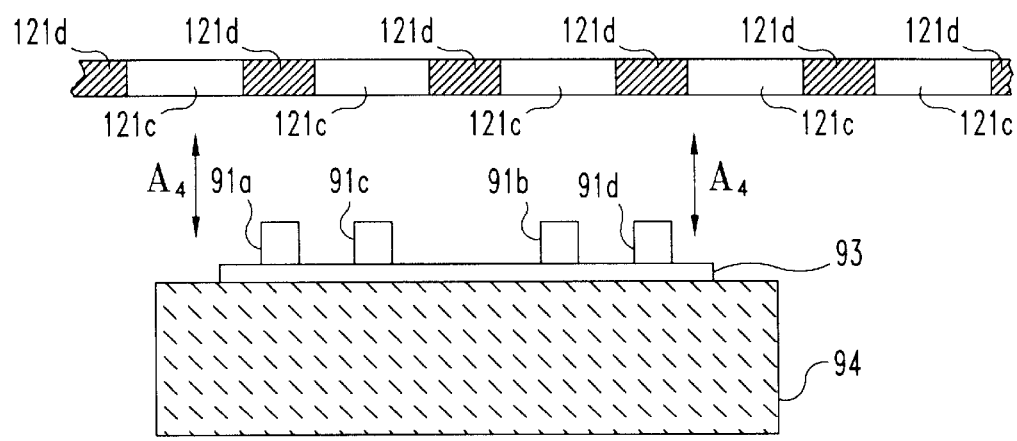
FIG. 4C is a cross-sectional side view of the magneto-resistance sensor of FIG. 4B taken along line V—V as spatially positioned from a cross-sectional view of a target wheel of FIG. 4A taken along line IV—IV.

Referring to FIGS. 4B and 4C, magneto-resistance sensor 90 includes a magnetoresistor element 91a, a magneto-resistor 91b, a magneto-resistor element 91c, a magneto-resistor 91d, a contact 92a as an input terminal, a contact 92b as an output terminal, a contact 92c as a reference terminal, a contact 92d as an input terminal, a contact 92e as an output terminal, a contact 92f as a reference terminal, a conductive layer 93, and a magnet 94. Magneto-resistors 91a, 91b, 91c, and 91d are disposed on surface 93a of conductive layer 93, and conductive layer 93 is disposed on a pole surface 94a, north or south, of magnet 94. Preferably, pole surface 94a is a north pole surface of magnet 94. Magneto-resistors 91a, 91b, 91c, and 91d are spatially positioned from target wheel 120 to define an air gap area $A_4$ therebetween whereby a magnetic field (not shown) as generated by magnet 94 traverses air gap area $A_4$. Magneto-resistor 91a is electrically coupled to contact 92a and to contact 92b, and magneto-resistor 91b is electrically coupled to contact 92b and to contact 92c to thereby output an analog signal from contact 92b when a power source is electrically coupled to contact 92a and a common reference is electrically coupled to contact 92c. Magneto-resistor 91c is electrically coupled to contact 92d and to contact 92e, and magneto-resistor 91d is electrically coupled to contact 92e and to contact 92f to thereby output an analog signal from contact 92e when a power source is electrically coupled to contact 92d and a common reference is electrically coupled to contact 92f.

Preferably, magneto-resistors 91a, 91b, 91c, and 91d are made from the same die with the same dimensions; magneto-resistors 91a and 91c are spaced by a 0.279 magnetic wavelength; magneto-resistors 91b and 91c are spaced by a 0.559 magnetic wavelength; magneto-resistors 91b and 91d are spaced by a 0.279 magnetic wavelength; and air gap area $A_4$ varies if at all between 0.5 millimeters and two (2) millimeters to thereby output the analog signal from contact 92b and output the analog signal from contact 92e. Incremental rotational motion detection system 210 can further comprise a first circuit (such as described herein) electrically coupled to contact 92b to thereby input the analog signal therefrom whereby the first circuit can output a first digital signal, e.g. digital signal $DS_1$ (FIGS. 2A and 2B), and a second circuit such as described herein electrically coupled to contact 92e to thereby input the analog signal therefrom whereby the second circuit can output a second digital signal, e.g. digital signal $DS_2$ (FIGS. 2A and 2B). System 210 can further comprise variable-reluctance sensor 100 (FIG. 3A) adjacently disposed within a housing 112, and consequently target wheel 120 would therefore include holes 121f, hole 121g, and rib 121h disposed along annular area 121e as shown.

Figure 5:
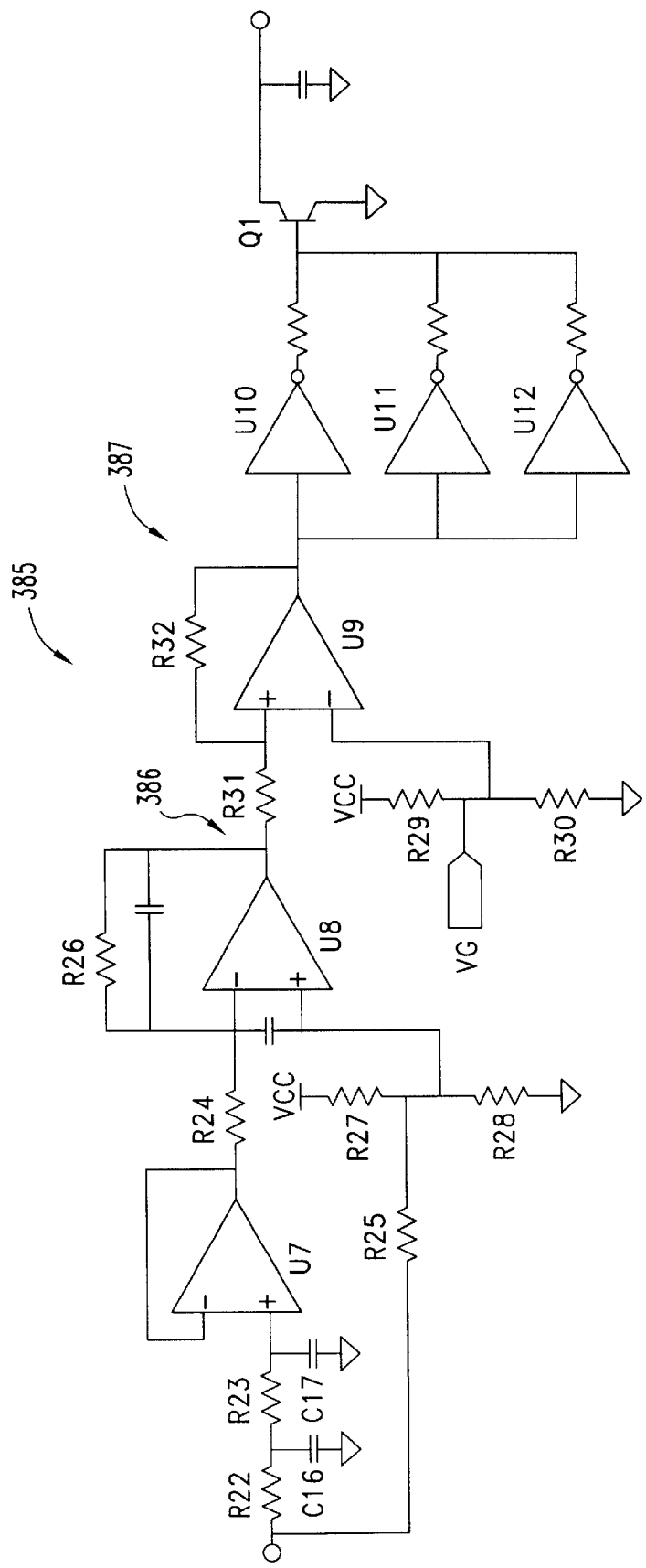
FIGS. 5 and 6 are schematic diagrams of alternative embodiments of sensor circuitry having offset compensation between the magnetic sensor and an amplifier.

FIG. 5 shows the circuit portion 385 of a fourth embodiment of a magnetic sensing device according to the present invention, with one example set of suitable component values indicated on the schematic. The disclosed circuit includes a two-stage low-pass filter consisting of resisters R22 and R23 and capacitors C16 and C17 connected to a voltage follower U7 which is in turn connected to the inverting input of a true, or balanced, differential amplifier 386, i.e., a differential amplifier having equal gain for signals supplied to its inverting and non-inverting inputs. More specifically, input resistors R24 and R25 are equal in value, and feedback resistor R26 is equal in value to the Thevenin resistance of the bias circuit consisting of resistors R27 and R28 connected in series between the supply voltage, VCC, and ground. It will be appreciated by those skilled in the art that the bias circuit has a Thevenin equivalent with a Thevenin voltage of ½ VCC and a Thevenin resistance of one-half the resistance of R27 (or R28). That is, with the given values, the bias circuit is effectively a 50 Kohm resistor connected between ½ VCC and the non-inverting input of op amp U8. Op amps U7 and U8 and comparator 387 are all supplied with the same positive supply voltage (VCC) and ground reference as the MR sensor and bias resistors R27 and R28. A reference voltage level equal to ½ VCC is established by means of R29 and R30 at the inverting input of the comparator, which is also provided with resistors R31 and R32 to provide hysteresis. It will be appreciated that the circuit of FIG. 5 may be employed as one of two or more identical channels connected to respective MR sensors to produce respective digital output signals. The reference-setting resistors R29 and R30 need not be duplicated for the other channels; instead, the established reference voltage (VG) may be supplied to all comparators. A TLC2272D op amp is suitable for op amps U7 and U8 and may also be used for comparator U9. Since such an op amp has a limited slew rate, a Schmitt trigger circuit is provided at the output of the comparator to ensure an output signal with a stable 50% duty cycle even during high-speed operation over a wide ambient temperature range. For such purposes, three MC14584B Schmitt triggers may be connected in parallel as shown. An output transistor Q1 may also be provided for a connection to an external circuit operating at different voltage levels. A TLC3702D comparator may be used for the comparator in place of the op amp described above, in which case the Schmitt trigger circuit may be eliminated and the comparator may be directly connected to the output transistor. As another alternative, the comparator and its associated resisters R29–R32 may be eliminated altogether and the op amp may be directly connected to the Schmitt trigger circuit, which itself has a nominal threshold level equal to ½ VCC. The comparator circuit is preferred for applications where it is desired to have greater or lesser hysteresis than that provided by the Schmitt trigger.

Figure 6:
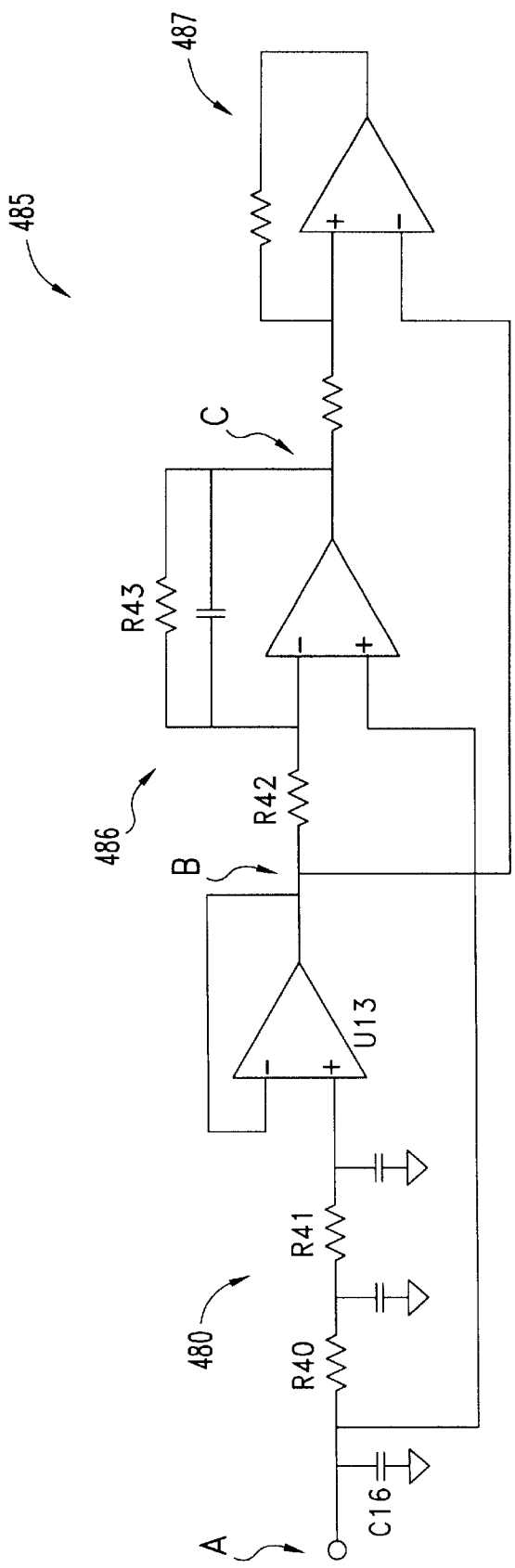

The circuit portion 485 of a fifth embodiment of a magnetic sensing device according to the present invention is shown in FIG. 6, with example component values indicated on the schematic. This circuit is similar to that of FIG. 3E, but includes a voltage follower U13 to provide isolation between low-pass filter 480 and amplifier 486. In this case, the low-pass filter is a two-stage filter as in the circuit of FIG. 5. It will be appreciated by those skilled in the art that the voltage at point B is equal to the DC level of the signal at point A, the input from the half-bridge MR sensor, and that the same DC level is present at point C, the amplifier output. The magnitude of the gain of the amplifier from point B to point C equals the ratio R43/R42, whereas the gain of the amplifier from point A to point C equals 1+R43/R42. That is, the transfer function of the amplifier in the frequency range of interest may be expressed as follows:

$$V_C = (1+k)V_A - kV_B$$

where $$k = R43/R42$$

The sensor output voltage $V_A$ includes an AC component and a DC component:

$$V_A = V_{AC} + V_{DC}$$

and $$V_B = V_{DC}$$

Therefore, $$V_C = (1+k)V_{AC} + (1+k)V_{DC} - kV_{DC} = (1+k)V_{AC} + V_{DC}$$

Since $V_B$ is also the comparator reference voltage, $V_C$ is compared to $V_{DC}$, whereby the value $(1+k)V_{AC}$ is effectively compared to zero. Thus, it can be appreciated that $V_B$ is a dynamic reference voltage or floating threshold that compensates for any offset in signal $V_A$ from the MR sensor. Selective amplification of the AC component of the sensor output signal as described above enables the circuit to more reliably determine when the sensor output signal is above or below the level of its DC component.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic incremental motion detection system with offset compensation, comprising,
    a target wheel having a plurality of uniformly circumferentially spaced indications adjoined thereto;
    a magnetic sensor positioned adjacent said target wheel with an air gap therebetween;
    a linear amplifier having first and second inputs, said first amplifier input connected to said magnetic sensor; and
    a low-pass filter connected between said magnetic sensor and said second input of said amplifier;
    a signal comparison stage connected to said amplifier for producing a digital signal in response to an analog output signal of said amplifier; and
    wherein said magnetic sensor is a magnetoresistive sensor comprising a half-bridge magnetoresistive sensor including first and second magnetoresistive elements connected in series, the junction between said elements being connected to said first amplifier input and to said low-pass filter.

2. A magnetic incremental motion detection system with offset compensation, comprising,
    a target wheel having more than two uniformly circumferentially spaced indications adjoined thereto;
    a magnetoresistive sensor positioned adjacent said target wheel with an air gap therebetween;
    an amplifier having an input connected to said magnetic sensor;
    a signal comparison stage connected to said amplifier for producing a digital signal in response to the analog output signal of said amplifier; and
    means for compensating for offset in the output signal of said magnetoresistive sensor.

3. The system of claim 2, wherein said offset compensating means is connected between said amplifier and said comparison stage.

4. The system claim 3, wherein said magnetoresistive sensor is a half-bridge magnetoresistive sensor including first and second magnetoresistive elements connected in series, the junction between said elements being connected to said first amplifier input and to said offset compensating means.

5. A magnetic incremental motion detection system with offset compensation, comprising,

- a target wheel having a plurality of uniformly circumferentially spaced indications adjoined thereto;
- a magnetic sensor positioned adjacent said target wheel with an air gap therebetween;
- an amplifier having an input connected to said magnetic sensor;
- a signal comparison stage connected to said amplifier for producing a digital signal in response to the analog output signal of said amplifier; and
- means connected between said magnetic sensor and said amplifier for compensating for offset in the output of said magnetic sensor.

6. The system of claim 5, wherein said magnetic sensor is a magnetoresistive sensor.

7. The system of claim 6, wherein said magnetoresistive sensor is a half-bridge magnetoresistive sensor including first and second magnetoresistive elements connected in series, the junction between said elements being connected to said first amplifier input and to said offset compensating means.

* * * * *